United States Patent
Wang et al.

(10) Patent No.: US 10,539,939 B2
(45) Date of Patent: Jan. 21, 2020

(54) METHOD FOR CONTROLLING CONSTANT AIR VOLUME OF ELECTRIC DEVICE ADAPTED TO EXHAUST OR SUPPLY AIR

(71) Applicant: Zhongshan Broad-Ocean Motor Co., Ltd., Zhongshan (CN)

(72) Inventors: Jizhong Wang, Zhongshan (CN); Yiqiao Zhou, Zhongshan (CN); Zheng Zhang, Zhongshan (CN); Ge Hu, Zhongshan (CN); Xiansheng Zhang, Zhongshan (CN); Yong Zhao, Zhongshan (CN)

(73) Assignee: ZHONGSHAN BROAD-OCEAN MOTOR CO., LTD., Zhongshan (CN)

(*) Notice: Subject to any disclaimer, the term of this patent is extended or adjusted under 35 U.S.C. 154(b) by 285 days.

(21) Appl. No.: 15/331,904

(22) Filed: Oct. 23, 2016

(65) Prior Publication Data

US 2017/0038089 A1    Feb. 9, 2017

Related U.S. Application Data

(63) Continuation-in-part of application No. PCT/CN2015/077456, filed on Apr. 24, 2015.

(30) Foreign Application Priority Data

Oct. 29, 2014  (CN) .......................... 2014 1 0598667

(51) Int. Cl.
G05B 17/02 (2006.01)
F24F 11/75 (2018.01)
F24F 11/63 (2018.01)

(52) U.S. Cl.
CPC .............. *G05B 17/02* (2013.01); *F24F 11/75* (2018.01); *F24F 11/63* (2018.01)

(58) Field of Classification Search
CPC .. F24F 11/047; F24F 2011/0061; F24F 11/75; F24F 11/63; F24F 11/77;
(Continued)

(56) References Cited

U.S. PATENT DOCUMENTS

| 5,325,286 A | 6/1994 | Weng et al. |
| 2009/0162255 A1 | 6/2009 | Chan et al. |

(Continued)

FOREIGN PATENT DOCUMENTS

| CA | 2814288 A1 | 11/2013 |
| CN | 102748843 A | 10/2012 |

(Continued)

*Primary Examiner* — Mouloucoulaye Inoussa
(74) *Attorney, Agent, or Firm* — Matthias Scholl, PC; Matthias Scholl

(57) ABSTRACT

A method for controlling air volume of an electric device to be constant, the device being adapted to exhaust or supply air, the method including: A) establishing M constant air volume control functions $Q_i=F(n)$ corresponding to M air volume points $CFM_i$ in the microprocessor of the system controller; B) allowing the microprocessor to receive or preset a target air volume $IN\text{-}^{CFM}$; C) starting the motor, when the motor operates in a stable state, comparing M air volume points $CFM_i$ with the target air volume $IN\text{-}^{CFM}$, and ensuring that the target air volume $IN\text{-}^{CFM}$ falls within two known air volume points $CFM_i$ and $CFM_{i-1}$; D) using the two known air volume points $CFM_i$ and $CFM_{i-1}$ to calculate a constant air volume control function $Q_0=F(n)$ corresponding to the target air volume $IN\text{-}^{CFM}$ by interpolation method; and E) controlling a motor parameter $Q_0$ and a rotational speed n.

18 Claims, 10 Drawing Sheets

(58) Field of Classification Search
CPC ....... F04D 25/06; F04D 19/002; G05B 17/02; Y02B 30/746; H02P 2205/03; H02P 6/16; H02P 27/06; H02P 6/06; H02P 21/141; H02K 21/16; H02K 1/2773
See application file for complete search history.

(56) References Cited

U.S. PATENT DOCUMENTS

2016/0117907 A1\* 4/2016 Wang ....................... F24F 11/30
  340/607
2016/0281723 A1\* 9/2016 Zhang ................... F04D 29/325

FOREIGN PATENT DOCUMENTS

| CN | 103375419 A | 10/2013 |
| CN | 103574725 A | 2/2014 |
| CN | 103809437 A | 5/2014 |
| CN | 103836691 A | 6/2014 |
| JP | 2008-082643 A | 4/2008 |

\* cited by examiner

US 10,539,939 B2

METHOD FOR CONTROLLING CONSTANT AIR VOLUME OF ELECTRIC DEVICE ADAPTED TO EXHAUST OR SUPPLY AIR

CROSS-REFERENCE TO RELATED APPLICATIONS

This application is a continuation-in-part of International Patent Application No. PCT/CN2015/077456 with an international filing date of Apr. 24, 2015, designating the United States, now pending, and further claims priority benefits to Chinese Patent Application No. 201410598667.6 filed Oct. 29, 2014. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, Mass. 02142.

BACKGROUND OF THE INVENTION

Field of the Invention

The invention relates to a method for controlling constant air volume of an electric device adapted to exhaust or supply air.

Description of the Related Art

Typically, an air flowmeter is directly installed in an air duct of an electric device to ensure a constant volume air flow. The method increases the production cost, and a dysfunction of the air flowmeter may result in control failure.

Other methods for controlling the constant air volume require monitoring of static pressure to adjust the rotational speed, or require strong computing capacity of the MCU of the motor controller, all of which increase the production cost.

In addition, the motor controller is usually installed on the motor body and the motor body is installed in the air duct. This arrangement complicates the installation and affects the ventilation efficiency of the electric device.

SUMMARY OF THE INVENTION

In view of the above-described problems, it is one objective of the invention to provide a method for controlling a constant air volume. The method adopts the motor body excluding the controller. The components configured to achieve the constant air volume control are primarily integrated on the main control circuit board of the system controller, and the algorithm is simple, so that the production cost is greatly saved and the structure of the product is simplified.

To achieve the above objective, in accordance with one embodiment of the invention, there is provided a method for controlling a constant air volume for an electric device adapted to exhaust or supply air. The electric device comprises: a motor, a wind wheel, a power supply, and a system controller. The system controller comprises a main control circuit board for realizing functions of the electric device. The motor drives the wind wheel to rotate under the driving of the main control circuit board. A motor body is equipped with no motor controller and comprises: a rotational shaft, a permanent magnet rotor assembly, a stator assembly, and a housing assembly. Permanent magnets are mounted in the permanent magnet rotor assembly. The permanent magnet rotor assembly and the stator assembly form magnetic coupling. The stator assembly comprises: a stator core and a coil winding wound on the stator core. A microprocessor, an inverter circuit, and an operation parameter detecting circuit are arranged on the main control circuit board. The operation parameter detecting circuit inputs real-time operation parameters into the microprocessor. An output terminal of the microprocessor controls the inverter circuit, and an output terminal of the inverter circuit is connected to the coil winding. The method comprises:

A) establishing M constant air volume control functions $Q_i=F(n)$ corresponding to M air volume points $CFM_i$ in the microprocessor of the system controller, where Q represents an input power, a DC bus current, or a torque, n represents a rotational speed of the motor, and i represents an integer ranging from 1 to M;

B) allowing the microprocessor to receive or preset a target air volume IN-$^{CFM}$;

C) starting the motor, when the motor operates in a stable state, comparing M air volume points CFMi with the target air volume IN-$^{CFM}$, and ensuring that the target air volume IN-$^{CFM}$ falls within two known air volume points CFMi and CFMi−1;

D) using the two known air volume points CFMi and CFMi−1 to calculate a constant air volume control function $Q0=F(n)$ corresponding to the target air volume IN-$^{CFM}$ by interpolation method; and E) controlling a motor parameter Q0 and a rotational speed n to enable the motor to operate in accordance with a definition curve of the constant air volume control function $Q0=F(n)$, and ensuring that an air suction or output of the electric device is constant.

The functions $Q_i=F(n)$ are established as follows: for M target air volumes, allowing the motor to operate at a constant rotational speed, regulating a static pressure from a lower boundary to an upper boundary which covers an actual static pressure range in an air duct device, and then regulating the rotational speed n and the parameter Q of the motor to keep the target air volumes, and recording the rotational speed n and the corresponding parameter Q at the stable state of the motor, whereby obtaining a group of rotational speeds n and parameters Q for each of the M target air volumes, and establishing the function $Q_i=F(n)$ for each target air volume by curve fitting.

In a class of this embodiment, the M air volume points $CFM_i$ comprises a maximum output air volume and a minimum output air volume.

$Q_i=F(n)$ is a second-order function, and each target air volume point corresponds to a function $Q=C_1+C_2\times n+C_3\times n^2$.

In a class of this embodiment, the constant air volume control function $Q0=F(n)$ corresponding to the target air volume IN-$^{CFM}$ is acquired as follows:

1) selecting three rotational speeds n1, n2, and n3, inputting the three rotational speeds n1, n2, and n3 into constant air volume control functions $Qi=F(n)$ and $Qi-1=F(n)$ corresponding to the two air volumes CFMi and CFMi−1 to yield six values Q11, Q21, Q12, Q22, Q13, and Q23, in which, the rotational speed n1 corresponds to Q11 and Q21, the rotational speed n2 corresponds to Q12 and Q22, and the rotational speed n3 corresponds to Q13 and Q23;

2) calculating a weighted value according to $$w = \frac{CFM - CFM\ 2}{CFM\ 2 - CFM\ 1},$$

and using the weighted value to calculate Q01, Q02, and Q03 of Q0 in the constant air volume control function of the target air volume IN-$^{CFM}$ corresponding to the three rotational speeds n1, n2, and n3, where $$Q01=Q21+W(Q11-Q21), Q02=Q22+W(Q12-Q22),$$
$$Q03=Q23+W(Q13-Q23); \text{ and}$$

3) inputting the three rotational speeds n1, n2, and n3 and corresponding Q01, Q02, and Q03 into the function $Q=C_1+C_2\times n+C_3\times n^2$ to acquire coefficients C1, C2, and C3.

In a class of this embodiment, the electric device is an air conditioner. The main control circuit board is a main control board of an air conditioner controller, and the main control board is further connected to a compressor and an expansion valve.

In a class of this embodiment, the electric device is a lampblack presser. The main control circuit board is a main control board of the lampblack presser. The main control board of the lampblack presser further comprises a display circuit and a key input circuit. The display circuit and the key input circuit are connected to the microprocessor.

In a class of this embodiment, a number of the M air volumes is at least five.

Advantages of the method for controlling a constant air volume of an electric device adapted to exhaust or supply air according to embodiments of the invention are summarized as follows:

1) The method of the invention establishes M constant air volume control functions $Qi=F(n)$ corresponding to M air volume points $CFM_i$ in the microprocessor of the system controller, allows the microprocessor to receive or preset a target air volume IN-$^{CFM}$; compares M air volume points CFMi with the target air volume IN-$^{CFM}$, and ensures that the target air volume IN-$^{CFM}$ falls within two known air volume points CFMi and CFMi−1; uses the two known air volume points CFMi and CFMi−1 to calculate a constant air volume control function $Q0=F(n)$ corresponding to the target air volume IN-$^{CFM}$ by interpolation method; and controls a motor parameter Q0 and a rotational speed n to enable the motor to operate in accordance with a definition curve of the constant air volume control function $Q0=F(n)$, so that an air suction or output of the electric device is ensured constant. The calculation is simple. The motor body employed is equipped with no controller, and components for realizing the method for controlling the constant air volume are principally integrated in the main control circuit board of the system controller, thus greatly saving the cost and simplifying the product structures.

2) M constant air volume control function $Qi=F(n)$ corresponding to the M air volume points CFMi are established in the microprocessor of the system controller, so that the constant air volume control function $Q0=F(n)$ corresponding to any input target air volume IN-CFM by weighted interpolation. The method is simple and practicable and does not require the microprocessor to have powerful computing capacity, thus, the production cost can be reduced.

3) The above function $Qi=F(n)$ is acquired as follows: for M target air volumes, allowing the motor to operate at a constant rotational speed, regulating a static pressure from a lower boundary to an upper boundary which covers an actual static pressure range in an air duct device, and then regulating the rotational speed n and the parameter Q of the motor to keep the target air volume, and recording the rotational speed n and the corresponding parameter Q at the stable state of the motor. Thus, a group of rotational speeds n and parameters Q are obtained for each of the M target air volumes, and the function $Qi=F(n)$ is established for each target air volume by curve fitting. At least five air volume points are provided, therefore the accuracy of the measurement is ensured.

BRIEF DESCRIPTION OF THE DRAWINGS

The invention is described hereinbelow with reference to the accompanying drawings, in which.

DETAILED DESCRIPTION OF THE EMBODIMENTS

For further illustrating the invention, experiments detailing a method for controlling a constant air volume rotor of an electric device adapted to exhaust or supply air are described hereinbelow combined with the drawings.

Figure 1:
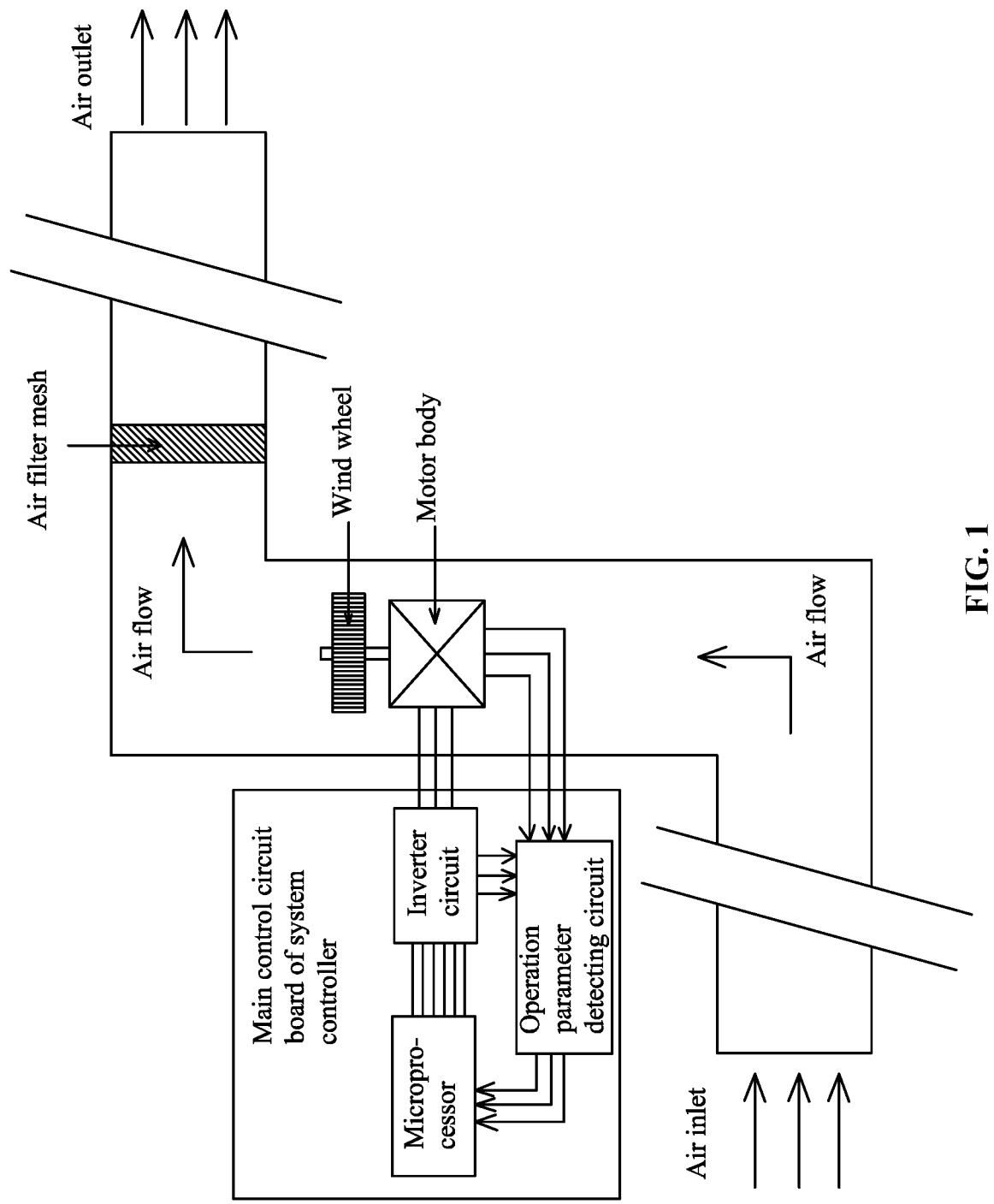
FIG. 1 is a schematic diagram of a method for controlling a constant air volume.

As shown in FIG. 1, a blower system (e.g., a gas furnace or an air processor, which are replaced with "motor+wind wheel" in the figure) is installed in a typical air-conditioning ventilation duct. An air filter mesh is also disposed in the air duct. When the motor is started, the air is blasted. The number of air inlets and air outlets are related to the room number, no unified standards exist in the design of the air duct, and the air filter meshes may have different pressure drops, thus a technical solution is necessary to obtain a constant air volume. A method for controlling a constant air volume of an electric device adapted to exhaust or supply air is provided. The electric device comprises: a motor, a wind wheel, a power supply, and a system controller. The system controller is provided with a main control circuit board for realizing functions of the electric device. The motor drives the wind wheel to rotate under the driving of the main control circuit board. The motor body is equipped with no motor controller and comprises: a rotational shaft 15, a permanent magnet rotor assembly, a stator assembly, and a housing assembly. Permanent magnets are mounted in the permanent magnet rotor assembly. The permanent magnet rotor assembly and the stator assembly form magnetic coupling. The stator assembly comprises: a stator core and a coil winding wound on the stator core. A microprocessor, an inverter circuit, and an operation parameter detecting circuit are arranged on the main control circuit board. The operation parameter detecting circuit inputs real-time operation parameters into the microprocessor. An output terminal of the microprocessor controls the inverter circuit, and an output terminal of the inverter circuit is connected to the coil winding. The method comprises the following steps:

A) establishing M constant air volume control functions $Qi=F(n)$ corresponding to M air volume points $CFM_i$ in the microprocessor of the system controller, where Q represents an input power, a DC bus current, or a torque, n represents a rotational speed of the motor, and i represents an integer ranging from 1 to M;

B) allowing the microprocessor to receive or preset a target air volume IN-$^{CFM}$;

C) starting the motor, when the motor operates in a stable state, comparing M air volume points CFMi with the target air volume IN-$^{CFM}$, and ensuring that the target air volume IN-$^{CFM}$ falls within two known air volume points CFMi and CFMi−1;

D) using the two known air volume points CFMi and CFMi−1 to calculate a constant air volume control function $Q0=F(n)$ corresponding to the target air volume IN-$^{CFM}$ by interpolation method;

E) controlling a motor parameter Q0 and a rotational speed n to enable the motor to operate in accordance with a definition curve of the constant air volume control function $Q0=F(n)$, and ensuring that an air suction or output of the electric device is constant.

Figure 2:
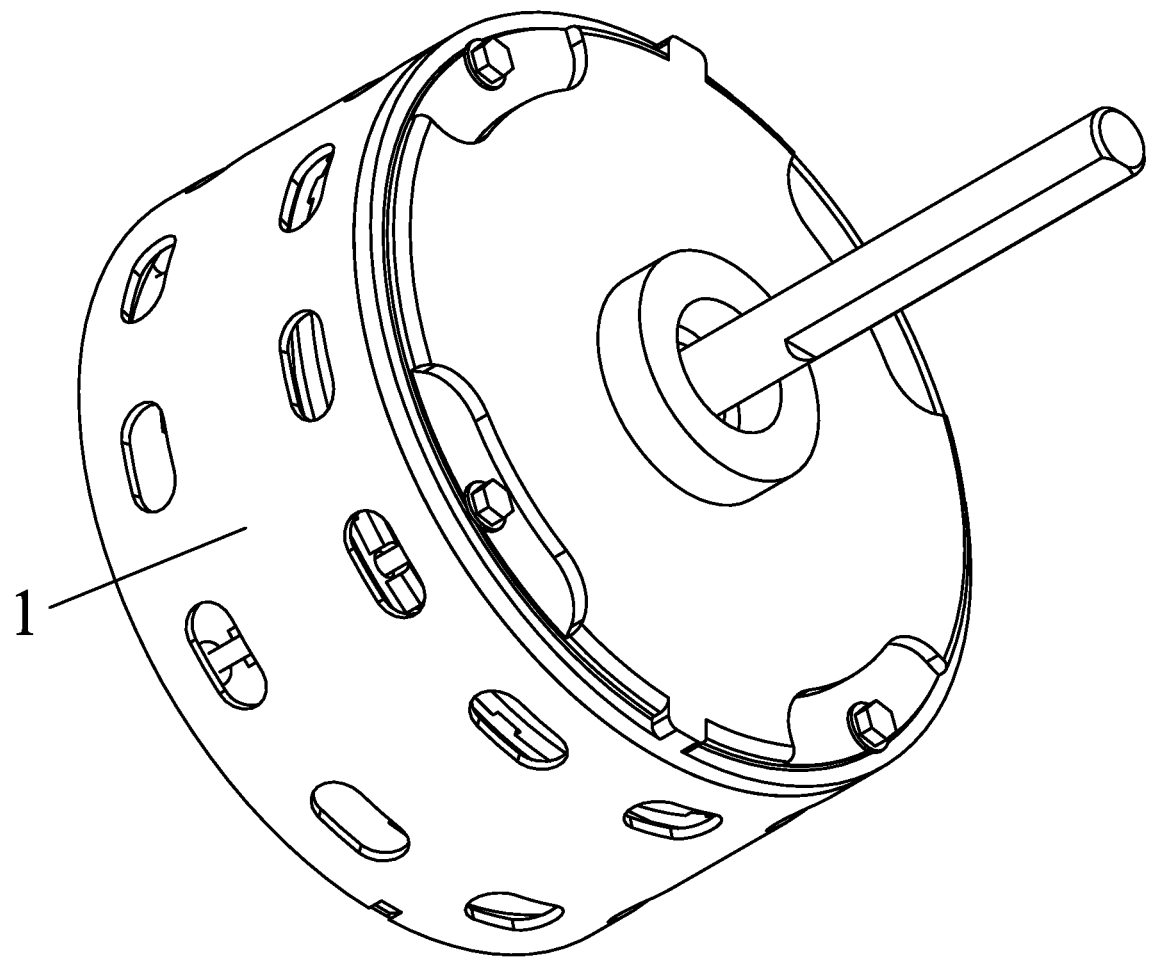
FIG. 2 is a stereogram of a motor body.
Figure 3:
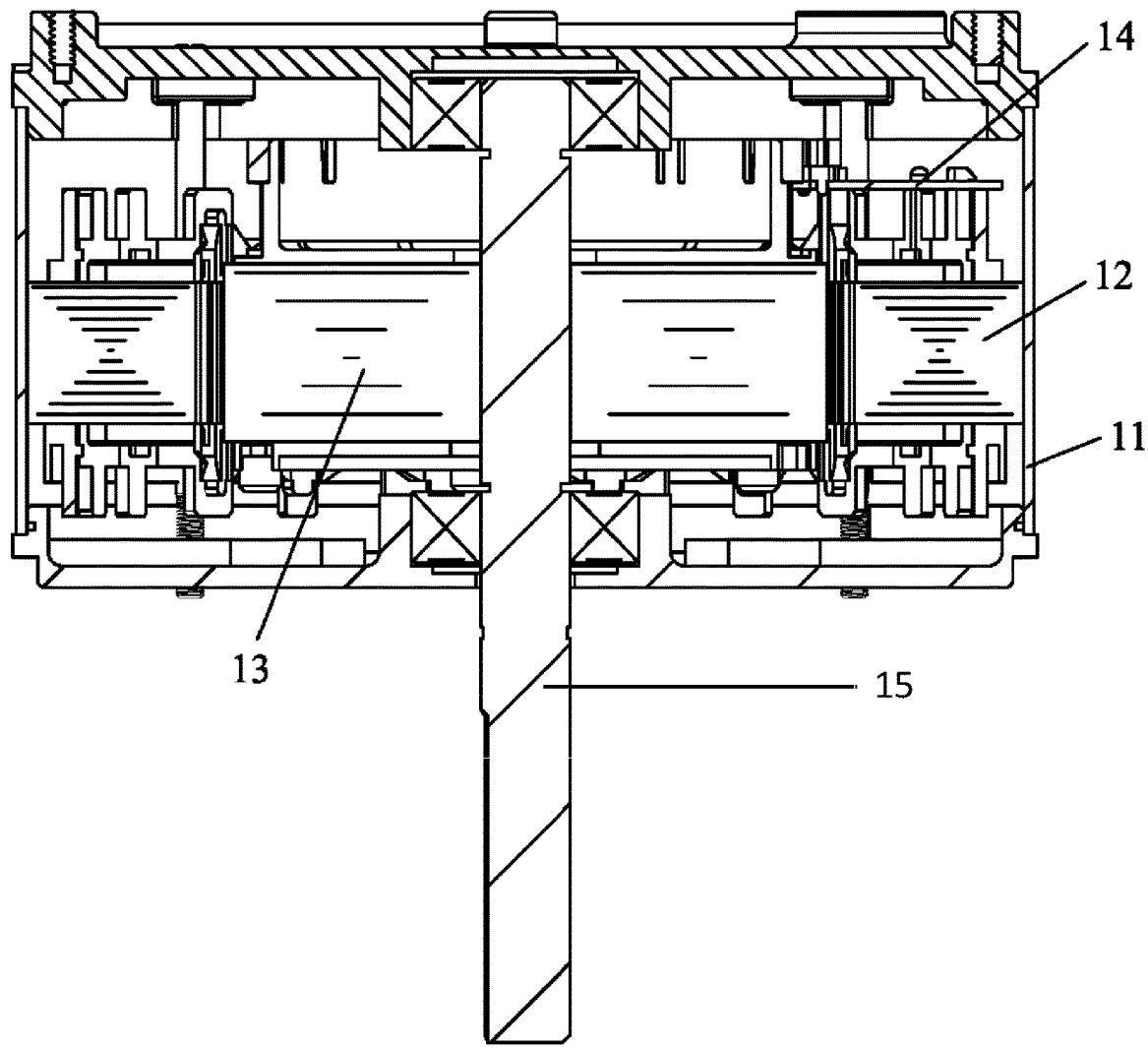
FIG. 3 is a cross sectional view of a motor body.

As shown in FIGS. 2-3, the motor comprises a motor body 1. The motor body 1 comprises: a stator assembly 12, a rotor assembly 13, and a housing assembly 11. The stator assembly is mounted on the housing assembly 11. The motor body 1 is provided with a Hall sensor 14 (indicated in FIG. 5) for detecting a rotor position. The rotor assembly 13 is nested inside or outside the stator assembly 12. A rotor position measuring circuit is configured to detect a rotor position signal and to input the rotor position signal to the microprocessor. The bus current detecting circuit inputs the detected bus current into the microprocessor, and a bus voltage detecting circuit inputs a DC bus voltage into the microprocessor. The microprocessor controls the inverter circuit, and the inverter circuit controls the power-on and power-off state of each phase of coil windings by controlling the stator assembly 12.

The functions $Qi=F(n)$ are established as follows: for M target air volumes, allowing the motor to operate at a constant rotational speed, regulating a static pressure from a lower boundary to an upper boundary which covers an actual static pressure range in an air duct device, and then regulating the rotational speed n and the parameter Q of the motor to keep the target air volumes, and recording the rotational speed n and the corresponding parameter Q at the stable state of the motor. Thus, a group of rotational speeds n and parameters Q are obtained for each of the M target air volumes, and the function $Qi=F(n)$ is established for each target air volume by curve fitting.

The M air volume points $CFM_i$ comprises a maximum output air volume and a minimum output air volume.

$Qi=F(n)$ is a second-order function, and each target air volume point corresponds to a function $Q=^{C_1+C_2 \times n+C_3 \times n^2}$.

The constant air volume control function $Q0=F(n)$ corresponding to the target air volume IN-$^{CFM}$ is acquired as follows:

1) selecting three rotational speeds n1, n2, and n3, inputting the three rotational speeds n1, n2, and n3 into constant air volume control functions $Qi=F(n)$ and $Qi-1=F(n)$ corresponding to the two air volumes CFMi and CFMi−1 to yield six values Q11, Q21, Q12, Q22, Q13, and Q23, in which, the rotational speed n1 corresponds to Q11 and Q21, the rotational speed n2 corresponds to Q12 and Q22, and the rotational speed n3 corresponds to Q13 and Q23;

2) calculating a weighted value according to $$w = \frac{CFM - CFM\ 2}{CFM\ 2 - CFM\ 1},$$

and using the weighted value to calculate Q01, Q02, and Q03 of Q0 in the constant air volume control function of the target air volume IN-$^{CFM}$ corresponding to the three rotational speeds n1, n2, and n3, where $Q01=Q21+W(Q11-Q21)$, $Q02=Q22+W(Q12-Q22)$, $Q03=Q23+W(Q13-Q23)$; and 3) inputting the three rotational speeds n1, n2, and n3 and corresponding Q01, Q02, and Q03 into the function $Q=C_1+C_2 \times n+C_3 \times n^2$ to acquire coefficients C1, C2, and C3.

Example 1

Figure 4:
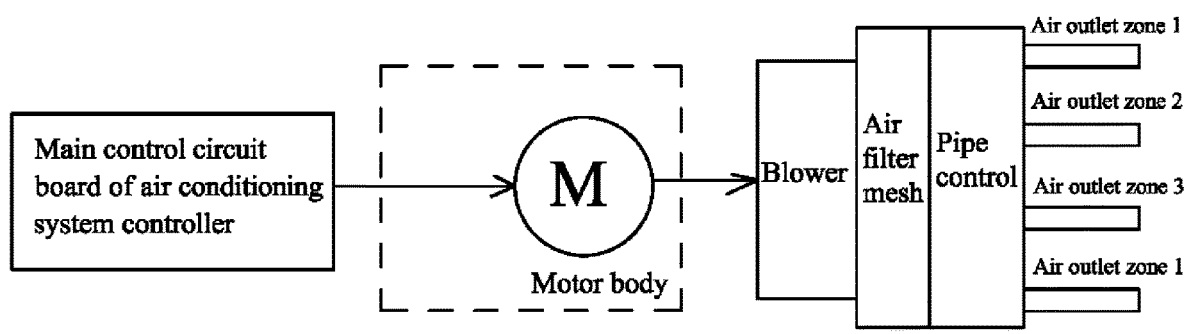
FIG. 4 is an installation diagram of an air conditioner where a method for controlling a constant air volume is applied in accordance with Example 1.
Figure 5:
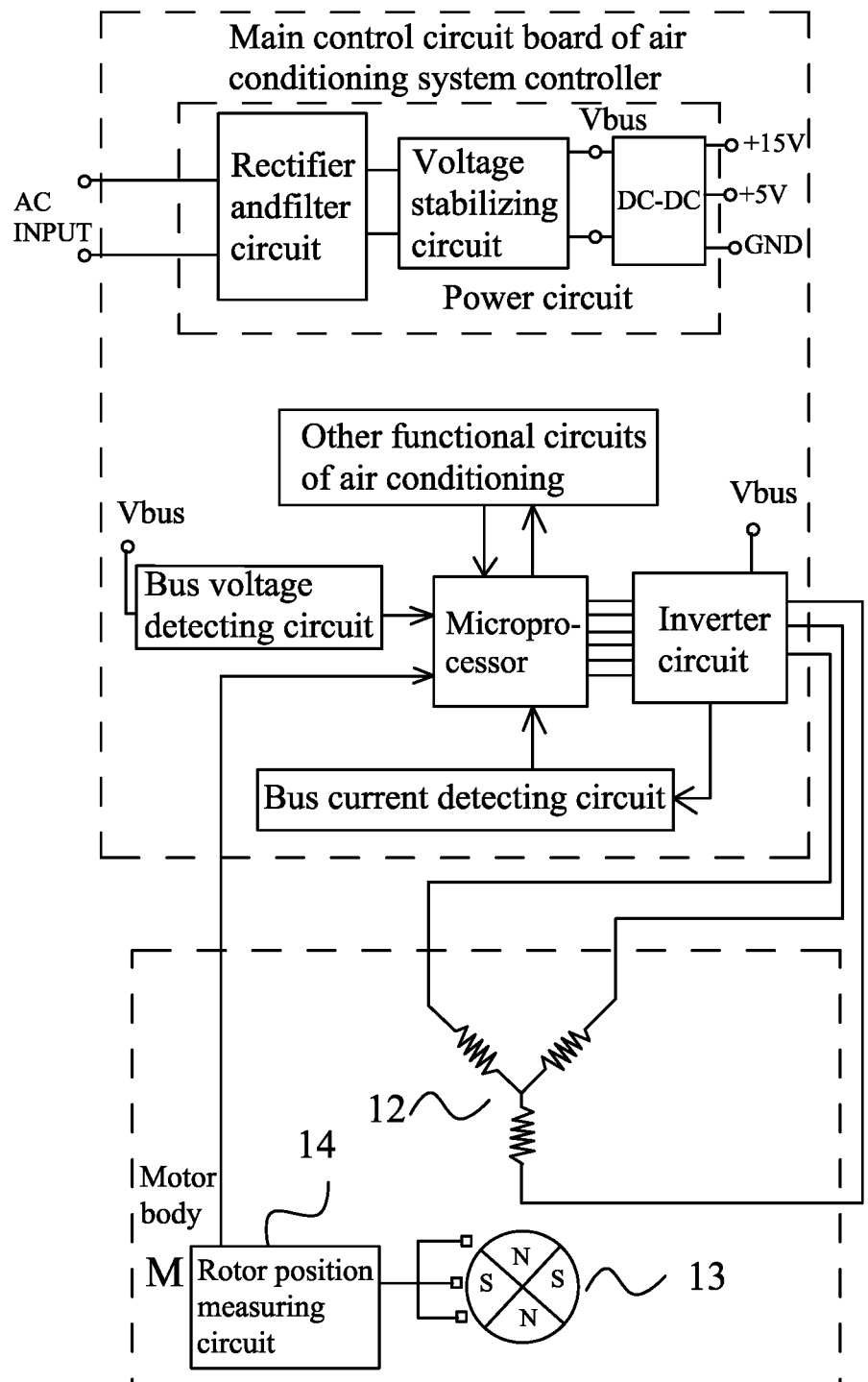
FIG. 5 is a circuit block diagram for realizing a method for controlling a constant air volume in accordance with Example 1.

As shown in FIGS. 4-5, the electric device is an air conditioner provided with a system controller. The system controller is provided with a main control circuit board for realizing the function of the air conditioner. A microprocessor, an inverter circuit, and an operation parameter detecting circuit are arranged on the main control circuit board. The operation parameter detecting circuit inputs real-time operation parameters of the motor into the microprocessor. An output terminal of the microprocessor controls the inverter circuit, and an output terminal of the inverter circuit is connected to the coil winding.

Figure 6:
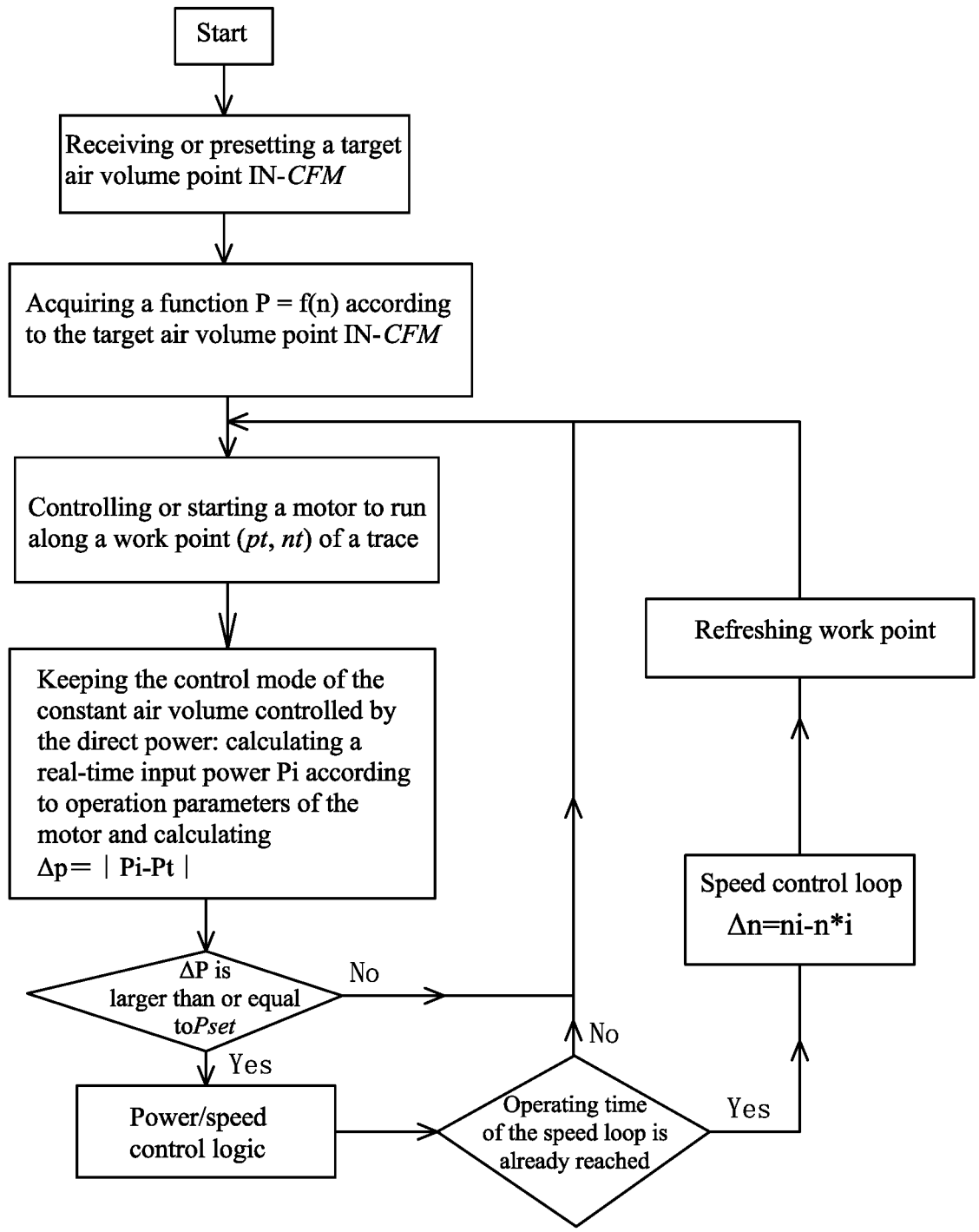
FIG. 6 is a flow chart of a method for controlling a constant air volume in accordance with Example 1.

As shown in FIG. 6, a method for controlling a constant air volume in an air conditioning system by direct power control is illustrated. The motor drives a wind wheel and comprises: a stator assembly and a permanent magnet rotor assembly. The microprocessor, the inverter circuit, a bus current detecting circuit, a bus voltage detecting circuit, and an input power control circuit (not shown in the figure) are arranged on the main control circuit board. The signal of the rotor position is detected by the rotor position measuring circuit, and a real-time rotational speed n of the motor is calculated by the microprocessor according to the signal of the rotor position. The bus current is input into the microprocessor by the bus current detecting circuit, and the DC bus voltage is input into the microprocessor by the bus voltage detecting circuit. The inverter circuit is controlled by the microprocessor. The power-on and power-off state of each phase of the coil windings of the stator assembly is controlled by the inverter circuit, and the input power control circuit is controlled by the microprocessor. The method comprises the following steps:

A) starting the motor controller, receiving or presetting an target air volume point IN-CFM;

B) acquiring a function $P=f(n)$ according to the target air volume point IN-CFM, in which, n represents the rotational speed, and P represents the input power of the motor;

C) entering the control mode of the constant air volume controlled by the direct power: starting the motor, allowing the motor to reach a stable work point $(p_t, n_t)$ along a control trace of the function $P=f(n)$, in which $p_t, n_t$ is a pair of input power and rotational speed satisfying the trace of the function $P=f(n)$ involving the constant air volume control;

D) keeping the control mode of the constant air volume controlled by the direct power: calculating a real-time input power $P_i$ according to operation parameters of the motor and calculating $\Delta P=|Pt-Pi|$;

E) keeping the current work point when a power increase $\Delta P$ is smaller than a preset value $P_{set}$;

F) when the power increase $\Delta P$ is larger than the preset value $P_{set}$, determining by calculation of power/rotational speed control logic whether an operating time of a speed loop is reached; and when the operating time of the speed loop is not reached, keeping the current work point;

G) when the operating time of the speed loop is already reached, entering a speed control loop and regulating the speed according to $\Delta n=|ni-nt|$, in which, i represents a real-time rotational speed, reaching a new work point $(P_i, n_i)$, that is, $P_t=P_i$, and $n_t=n_i$, and return C).

The function $Pi=F(n)$ is acquired as follows: collecting original data, for multiple target air volumes, allowing the motor to operate at a constant rotational speed, regulating a static pressure from a lower boundary to an upper boundary which covers an actual static pressure range in an air duct device, and then regulating the rotational speed n and a real-time input power $P_i$ of the motor to keep the target air volume, and recording the rotational speed n at the stable state of the motor and the corresponding real-time input power $P_i$. Thus, a group of the rotational speed n and the real-time input power $P_i$ are obtained for each of the M target air volumes, and the function $Qi=F(n)$ is obtained for each target air volume by curve fitting.

When the target air volume point IN-CFM input from the external is not equal to any of the multiple target air volume, a function of $P=f(n)$ corresponding to any of the target air volume points IN-CFM input from the external is calculated by fitting via interpolation method, thereby realizing the constant air volume control for any target air volume in the entire process.

The function $P=f(n)$ is a polynomial function, $P=C_1+C_2 \times n+ \ldots +C_m \times n^{m-1}$, in which $C_1, C_2 \ldots, C_m$ represent coefficients, n represents the rotational speed of the motor. Each target air volume corresponds to a group of coefficients $C_1, C_2 \ldots, C_m$ and the corresponding relations are stored. A corresponding group of the coefficients $C_1, C_2 \ldots, C_m$ are acquired by the microprocessor according to the input target air volume points IN-CFM by a look-up table method and the interpolation method.

The function $P=f(n)$ is a second order function $P=C_1+C_2 \times n+C_3 \times n^2$.

Figure 7:
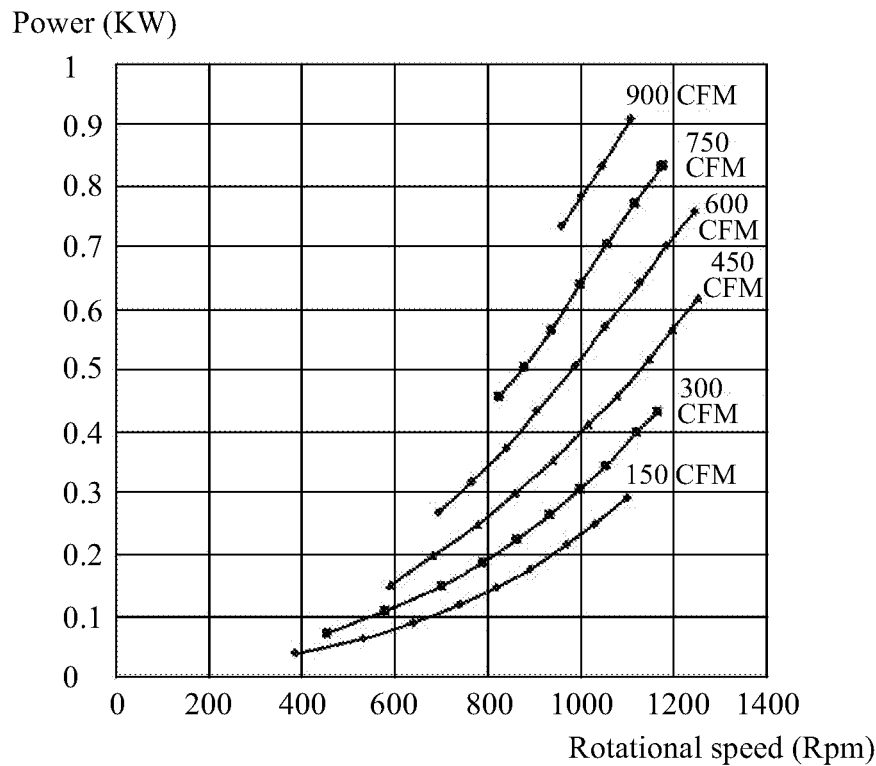
FIG. 7 is fitting curves of constant air volumes acquired from measurement in accordance with Example 1.

The mathematical model of the method for controlling the constant air volume by the direct power control of the invention is developed and established as follows: generally speaking, in the air ventilation system, the blower is driven by the blower motor to produce the air flow in a stable state. The constant air volume control is realized by the control of the speed and the power at a static pressure, which satisfies the relation $CFM=F (P, speed, pressure)$, where CFM represents the air volume, P represents the power, speed represents the speed, and pressure represents the static pressure. When the static pressure changes, the constant air volume is maintained by controlling the power and the speed. The power and the speed change with the increase of the static pressure, which is illustrated by the CFM curves of the constant air volume in FIG. 7. Based on the CFM curves, the control model is developed. When the air volume requirement is determined by the product control, the constant air volume CFM is realized by controlling the power and the speed at a certain static pressure. As shown in FIG. 7, the characteristic curve represents the physical property of the constant air volume controlled by the power and the rotational speed. For any designed air flow system in a range of a rated power of the motor based on the test results of the power and the rotational speed curve, a typical second-order function $P=C_1+C_2 \times n+C_3 \times n^2$ can be used as a typical function for development and modeling. Three undetermined points (A, B, and C) are selected from the curve, corresponding coordinates of these points are (p1,n1), (p2,n2), and (p3,n3), and coefficients thereof are C1, C2, and C3, which satisfy the following equation:

$$F(A,B,C)=\Sigma_i^m(Yi-(C1+C2*n+C3*n^2))^2,$$

the equation is solved by $\partial F/\partial A=0$, $\partial F/\partial B=0$, and $\partial F/\partial C=0$, so that m=3.

The curve fitting process is selecting the polynomial curve for description. The coefficient of the polynomial can be calculated by the least square method. Theoretically, $P=C_1+C_2 \times n+C_3 \times n^2+ \ldots +Cm \times n^{m-1}$ is adopted for calculation, but in practice the binomial is adapted to satisfy the general requirement. The function relation $P=f(n)$ is a second-order function, $P=C_1+C_2 \times n+C_3 \times n^2$, in which $C_1, C_2$, and $C_3$ are coefficients, and n is the rotational speed of the motor. In multiple measured target air volume, each target air volume corresponds to a group of coefficients $C_1, C_2$, and $C_3$, and the corresponding relation is stored, so that the corresponding group of the coefficients $C_1, C_2$, and $C_3$ is acquired by the microprocessor using the look-up table method according to the input target air volume IN-CFM, thereby obtaining the function relation $P=f(n)$. Each target air volume of a certain load and the corresponding coefficient group thereof $C_1, C_2$, and $C_3$ are listed in Table 1.

TABLE 1

| CFM | $C_1$ | $C_2$ | $C_3$ |
| --- | --- | --- | --- |
| 150 | 0.338 | −0.151 | 0.0458 |
| 300 | 0.4423 | −0.2113 | 0.0765 |
| 450 | . . . | . . . | . . . |
| 600 | . . . | . . . | . . . |
| 750 | . . . | . . . | . . . |
| 900 | . . . | . . . | . . . |

Figure 8:
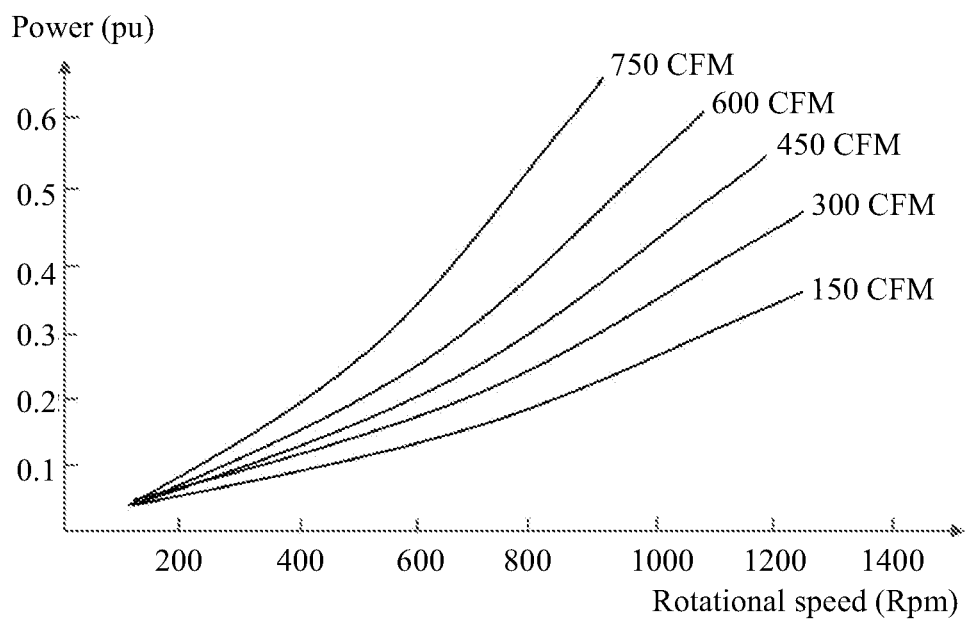
FIG. 8 is fitting curves of experimental data of constant air volumes by direct power control in accordance with Example 1.

FIG. 8 is fitting curves of experimental data of the constant air volume controlled by the direct power of a ⅓ HP blower motor in a small pipe of the air conditioning system. For a given target air flow, some typical air volume points CFM are selected by the system as test points to establish a data bank for the mathematical model. The typical air volume points include a minimum air volume and a maximum air volume, and additional middle points are selected according to the product specification. Five typical test points of the air volume CFM are provided, which are 150, 300, 450, 600, and 750 CFM.

An example is illustrated in Table 2 to show the results of the test data. The rotational speed of the motor ranges from 200 to 1400 rpm. The static pressure of the system is between 0.1 and 1 $H_2O$. The output of the preset constant air volume CCFM is maintained so as to acquire a per-unit value of the input power of the motor corresponding to FIG. 10 and to form the data bank.

TABLE 2

| 150 CFM air volume | | 300 CFM air volume | | 450 CFM air volume | | 600 CFM air volume | | 750 CFM air volume | |
|---|---|---|---|---|---|---|---|---|---|
| Rotational speed | Power | Rotational speed | Power | Rotational speed | Power | Rotational speed | Power | Rotational speed | Power |
| 385.3 | 3.6% | 452.2 | 6.9% | 590.1 | 14.8% | 693.6 | 26.6% | 822.9 | 45.6% |
| 385.9 | 3.6% | 577.7 | 10.6% | 680.6 | 19.6% | 763.9 | 31.6% | 878.1 | 50.4% |
| 531 | 6.0% | 700.3 | 14.6% | 778.5 | 24.7% | 839.3 | 37.2% | 936 | 56.4% |
| 637.3 | 8.6% | 787.5 | 18.4% | 858.4 | 29.8% | 905 | 43.2% | 997.9 | 63.9% |
| 737.4 | 11.6% | 861.2 | 22.2% | 940.5 | 35.2% | 987.8 | 50.6% | 1056 | 70.5% |
| 818.4 | 14.4% | 932.6 | 26.2% | 1015 | 41.0% | 1051 | 57.0% | 1115 | 77.1% |
| 891 | 17.4% | 997.9 | 30.5% | 1078 | 45.6% | 1127 | 64.1% | 1176 | 83.3% |
| 970.3 | 21.5% | 1053 | 34.2% | 1146 | 51.6% | 1184 | 70.2% | 1173 | 83.2% |
| 1029 | 24.8% | 1119 | 39.7% | 1197 | 56.6% | 1245 | 75.0% | | |
| 1100 | 28.3% | 1165 | 43.1% | 1252 | 61.6% | | | | |
| 1163 | 32.4% | | | | | | | | |

The least square method, the second order function relation between each preset air volume CFM and the corresponding power and rotational speed, is adopted to calculate the power defined by the equation and the rotational speed of the working point of any system under a given static pressure. When the preset air volume IN-CFM is input, a corresponding function is defined by the motor system, and the trace of the working point satisfies the definition of the function. The equations (3)-(7) can be presented by a standard equation, and C1, C2, and C3 are constants.

$$\text{Power}(150) = 0.3388\left(\frac{n}{1000}\right)^2 - 0.1551\left(\frac{n}{1000}\right) + 0.0458 \quad (3)$$

$$\text{Power}(300) = 0.4423\left(\frac{n}{1000}\right)^2 - 0.2113\left(\frac{n}{1000}\right) + 0.0765 \quad (4)$$

$$\text{Power}(450) = 0.3987\left(\frac{n}{1000}\right)^2 - 0.0308\left(\frac{n}{1000}\right) + 0.0294 \quad (5)$$

$$\text{Power}(600) = 0.2580\left(\frac{n}{1000}\right)^2 + 0.3983\left(\frac{n}{1000}\right) - 0.1379 \quad (6)$$

$$\text{Power}(750) = 0.1385\left(\frac{n}{1000}\right)^2 + 0.8150\left(\frac{n}{1000}\right) - 0.3139 \quad (7)$$

Thus, $P = C_1 + C_2 \times n + C_3 \times n^2$ is obtained. The established curves of the equations (3)-(7) provide five traces for the selected working points required by the five constant air volumes CFM.

Figure 9:
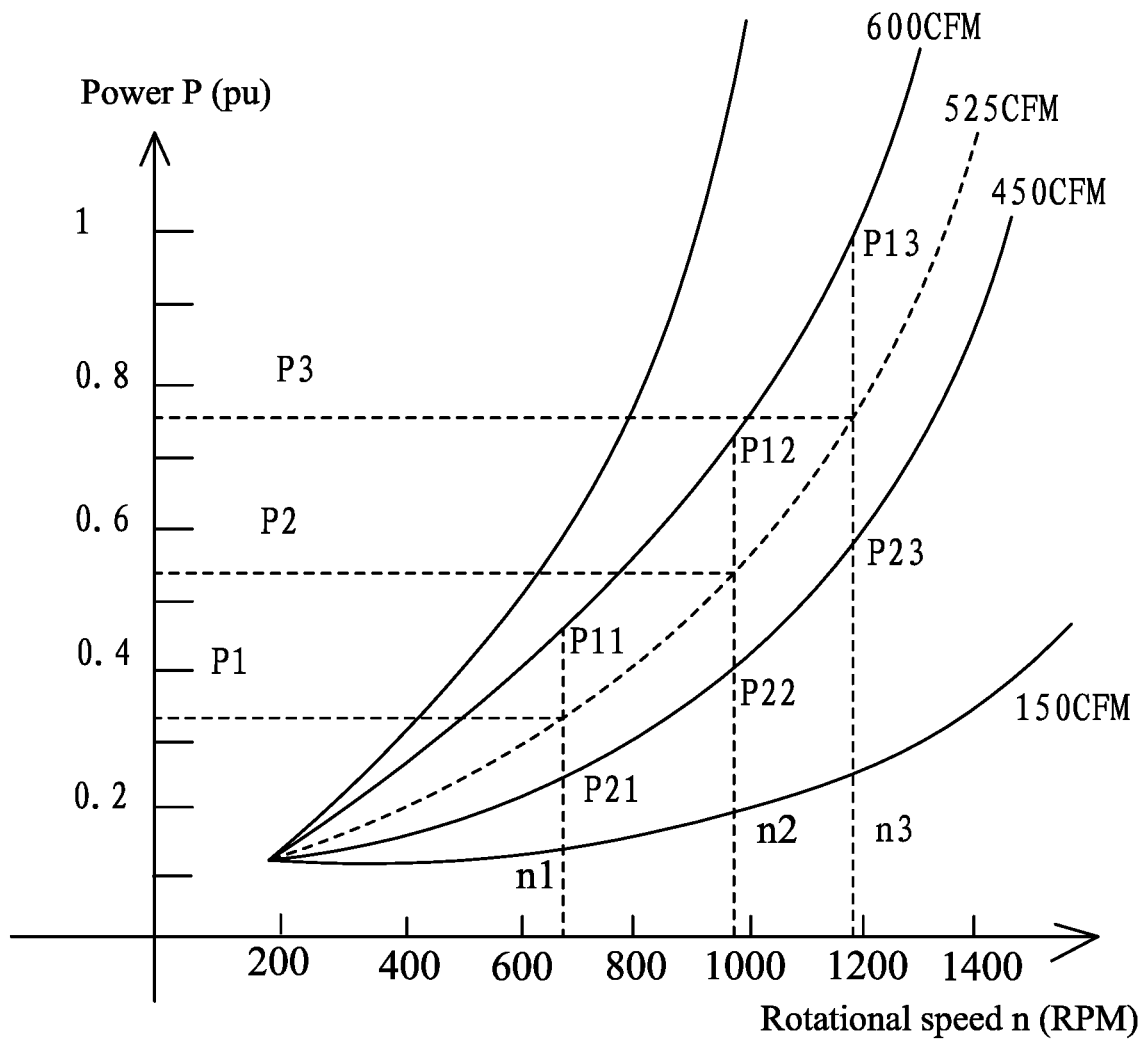
FIG. 9 is a schematic diagram of a constant air volume control function for solving any input air volume by interpolation method in accordance with Example 1.

As shown in FIG. 9, if the requested constant air volume IN-CFM is not any of the modeled curves, the interpolation method is used to acquire a new characteristic equation to fit the requested constant air volume IN-CFM. For example, when the requirement for the requested constant air volume IN-CFM=525 cfm is received, the adjacent two curves CFM1-600 cfm and CFM2-450 cfm are recognized by the model, and the new equation of the curve IN-CFM=525 cfm is calculated by the two corresponding equations. Based on the requested IN-CFM=525 cfm and the three selected rotational speed ω1, ω2, and ω3, the power values at these rotational speeds are calculated. The functions corresponding to the two model curves are utilized to calculate the P value for selected speed of the double power points by the linear weighted interpolation. Firstly, matrix data are listed as follows:

$$\begin{bmatrix} P_i \\ P_1(600) \\ P_2(450) \end{bmatrix} = \begin{bmatrix} n_1 & n_2 & n_3 \\ P_{11} & P_{12} & P_{13} \\ P_{21} & P_{22} & P_{23} \end{bmatrix}$$

As one pair of power points $(p_{1i}, p_{2i})$ corresponds to a selected speed n, the selected speeds n1, n2, and n3 correspond to three pairs of power points $(p_{1i}, p_{2i})$, and the linear weighted interpolation value can be used to calculate the $P_i$ according to the equation $pi = p_{2i} + w \cdot (p_{1i} - p_{2i})$. The weighted value W is calculated as follows:

$$w = \frac{CFM - CFM\,2}{CFM\,1 - CFM\,2}.$$

It should be noted that CFM2≤IN-CFM≤CFM1, and 0≤W≤1. The following matrix equation is calculated as follows:

$$\begin{bmatrix} n_1^2 & n_1 & 1 \\ n_2^2 & n_2 & 1 \\ n_3^2 & n_3 & 1 \end{bmatrix} \begin{bmatrix} C_1 \\ C_2 \\ C_3 \end{bmatrix} = \begin{bmatrix} P_1 \\ P_2 \\ P_3 \end{bmatrix}$$

Thus, the function $P = C_1 + C_2 \times n + C_3 \times n^2$ corresponding to IN-CFM=525 cfm can be acquired. Coefficients C1, C2, and C3 can be calculated by solving the matrix equation. Thus, the power equation can be acquired for any requested input air volume IN-CFM. Since such process is accomplished in the microprocessor-MCU in the motor controller, the power calculation does not consume much real-time CPU resource.

It is known that the direct power control adopts the rotational speed control to reach the power control. The control logic of the power/rotational speed functions in coordinating the time constant of the power/rotational speed circuit to ensure the stability of the system. The control can be realized by the accurate control of the motor and the comparison of the torque control.

The input power is acquired under the DC bus voltage and current. The power and the rotational speed are limited within the maximum power $P_{max}$ and the maximum rotational speed $n_{max}$. The scalar control is adopted, that is, the real-time bus current $I_{bus}$ and the real-time bus voltage Vbus are collected to calculate the real-time input power $P=I_{bus} \times V_{bus}$.

Example 2

Figure 10:
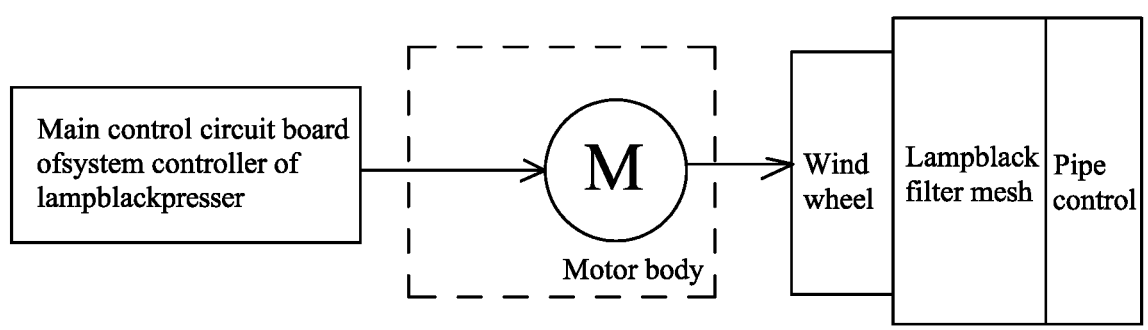
FIG. 10 is a structure diagram showing the mounting of the motor body for realizing the method for controlling the constant air volume in accordance with Example 2.
Figure 11:
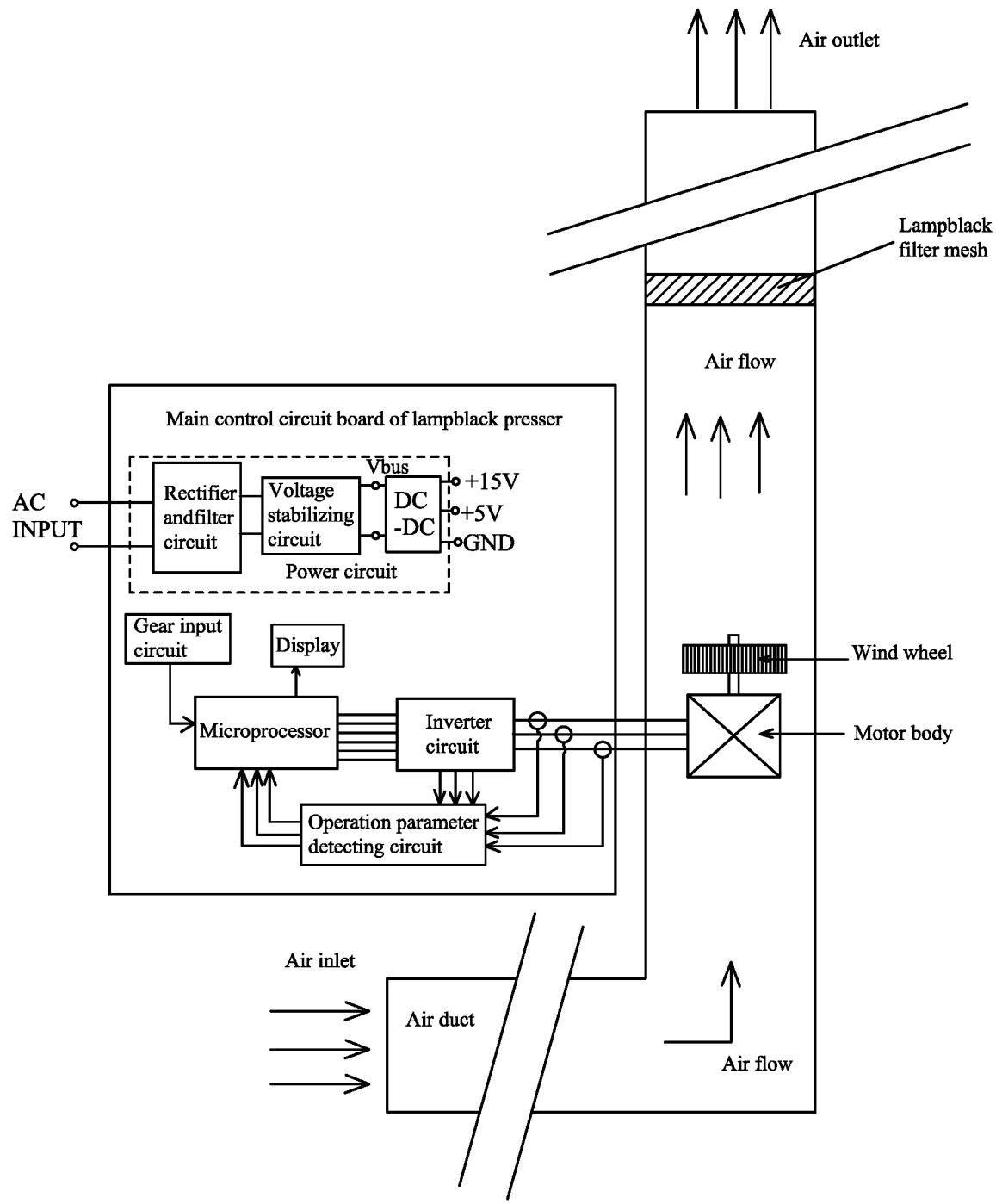
FIG. 11 is a specific schematic block diagram for realizing a method for controlling a constant air volume in accordance with Example 2.

As shown in FIGS. 10-11, the electric device applying the method for control the constant air volume is a lampblack presser. The lampblack presser comprises a system controller which is provided with a main control circuit board for realizing the function of the lampblack presser. A microprocessor, an inverter, an operation parameter detecting circuit, a dependent power circuit, a gear input circuit, and a display circuit are arranged on the main control circuit board. The gear input circuit and the display circuit are connected to the microprocessor, the operation parameter detecting circuit inputs the real-time operation parameters of the motor into the microprocessor, an output terminal of the microprocessor controls the inverter circuit, and the output terminal of the inverter circuit is connected to the coil winding. In the figures, the operation parameter detecting circuit is a three phase current detecting circuit which is able to calculate the rotor position by measuring the three phase current and adopts the vector control method. These have been specifically introduced in text books and patent literatures. The independent power circuit supplies power for other circuit parts. The wind wheel is mounted in the air duct, and a filter screen for filtering the oil fume is mounted in the air duct. The air duct possesses an air inlet and an air outlet.

As shown in FIGS. 2-3, the motor comprises a motor body 1. The motor body comprises: a stator assembly 12, a rotor assembly 13, and a housing assembly 11. The stator assembly 13 is mounted on the housing assembly 11, and the rotor assembly 13 is nested within or outside the stator assembly 12.

The method for controlling a constant air volume of the lampblack presser comprises the following steps:

A) establishing M constant air volume control functions $Ti=F(n)$ corresponding to M air volume points $CFM_i$ in the microprocessor of the system controller in the lampblack presser, where T represents a torque, n represents a rotational speed of the motor, and i represents an integer ranging from 1 to M;

B) allowing the microprocessor to receive or preset a target air volume IN-$^{CFM}$;

C) starting the motor, when the motor operates in a stable state, comparing M air volume points CFMi with the target air volume IN-$^{CFM}$, and ensuring that the target air volume IN-$^{CFM}$ falls within two known air volume points CFMi and CFMi−1;

D) using the two known air volume points CFMi and CFMi−1 to calculate a constant air volume control function T0=F(n) corresponding to the target air volume IN-$^{CFM}$ by interpolation method;

E) controlling a motor parameter T0 and a rotational speed n to enable the motor to operate in accordance with a definition curve of the constant air volume control function T0=F(n), and ensuring that an air suction or output of the electric device is constant.

The functions $Ti=F(n)$ are established as follows: for M target air volumes, allowing the motor to operate at a constant rotational speed, regulating a static pressure from a lower boundary to an upper boundary which covers an actual static pressure range in an air duct device, and regulating the rotational speed n and the torque T of the motor to keep the target air volumes, and recording the rotational speed n and the corresponding torque T at the stable state of the motor. Thus, a group of rotational speeds n and torque T are obtained for each of the M target air volumes, and the function $Ti=F(n)$ is established for each target air volume by curve fitting.

Data in practical tests are listed in Table 3.

TABLE 3

| Torque T (N * m) | Static pressure (Pa) | Actual air volume Q (CFM) | Actual rotational speed (RPM) |
|---|---|---|---|
| 0.4 | 25 | 1400 | 314 |
| 0.29 | 50 | 1400 | 935 |
| 0.27 | 75 | 1400 | 968 |
| ... | ... | ... | ... |
| ... | ... | ... | ... |
| ... | ... | ... | ... |
| 0.33 | 25 | 1080 | 713 |
| 0.29 | 50 | 1080 | 750 |
| 0.26 | 75 | 1080 | 785 |
| ... | ... | ... | ... |
| ... | ... | ... | ... |
| 0.25 | 25 | 800 | 472 |
| 0.22 | 37.5 | 800 | 501 |
| 0.20 | 50 | 800 | 545 |
| ... | ... | ... | ... |
| ... | ... | ... | ... |

Figure 12:
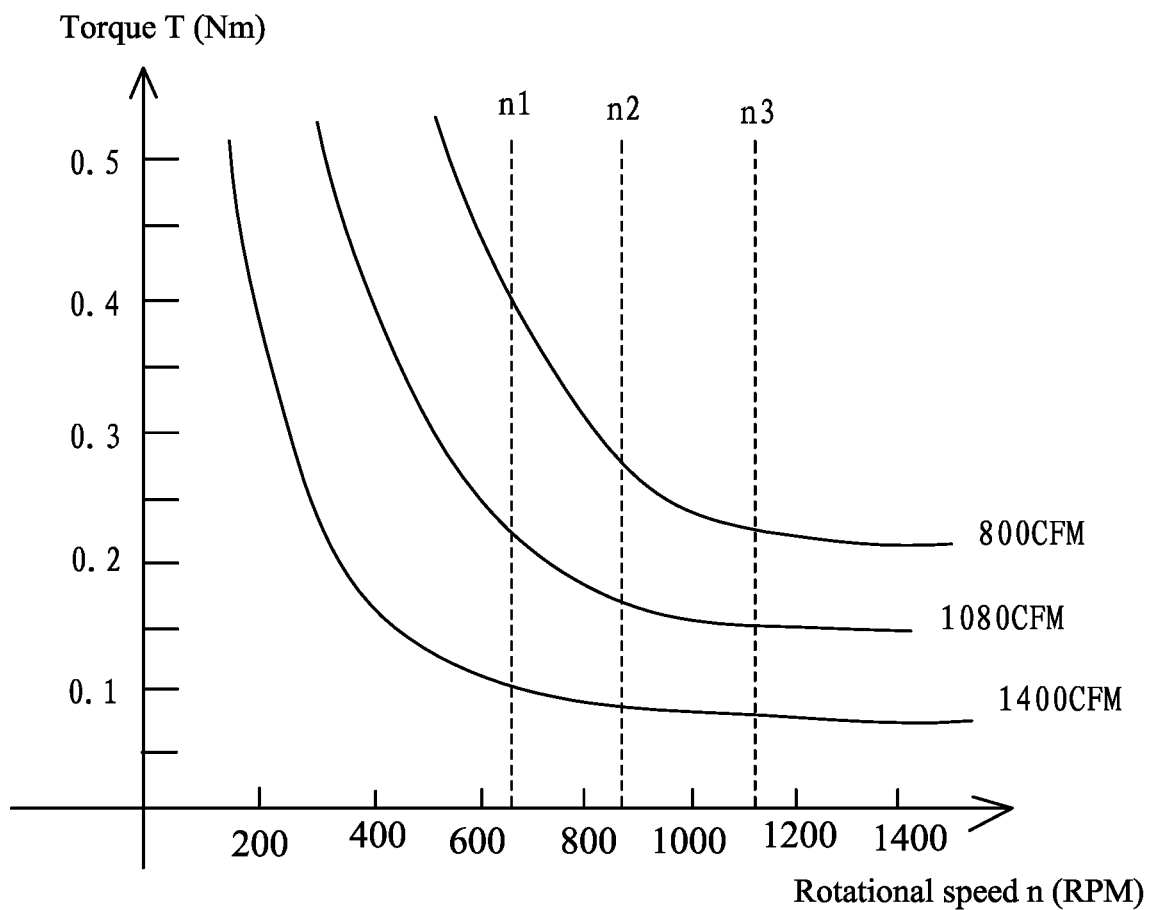
FIG. 12 is fitting curves of constant air volumes in accordance with Example 2.

As shown in FIG. 12, the curve is simulated according to the above data. Because the torque is negatively proportional to the rotational speed, the function $T=f(n)$ is a polynomial function, $T=C_1+C_2\times(1/n)+\ldots+C_m\times(1/n^{m-1})$, in which $C_1, C_2, \ldots, C_m$ represent coefficients, n represents the rotational speed of the motor. Each target air volume corresponds to a group of coefficients $C_1, C_2, \ldots, C_m$ and the corresponding relations are stored. A corresponding group of the coefficients $C_1, C_2, \ldots, C_m$ are acquired by the microprocessor according to the input target air volume points IN-CFM by the look-up table method and the interpolation method, so that the function $T=f(n)$ is acquired.

The function $T=f(n)$ is a second order function $T=C_1+C_2\times n+C_3\times n^2$.

The development and the establishment of the mathematical model of the method are as follows: in the air ventilation system, the blower is driven by the blower motor to produce the air flow in a stable state. The constant air volume control is realized by the control of the speed and the torque under a static pressure, which satisfies the relation CFM=F(T, speed, pressure), where CFM represents the air volume, T represents the torque, speed represents the speed, and pressure represents the static pressure. When the static pressure changes, the constant air volume is maintained by controlling the torque and the speed. The torque and the speed change with the increase of the static pressure, which is illustrated by the CFM curves of the constant air volume in FIG. 12. Based on the CFM curves, the control model is developed. When the air volume requirement is determined by the product control, the constant air volume CFM is realized by controlling the torque and the speed at a certain static pressure. As shown in FIG. 12, the characteristic curve represents the physical property of the constant air volume controlled by the torque and the rotational speed. For any designed air flow system in a range of a rated power of the motor based on the test results of the torque and the rotational speed curve, a typical second-order function $T=C_1+C_2\times(1/n)+C_3\times(1/n^2)$ can be used as a typical function for development and modeling. Three undetermined points (A, B, and C) are selected from the curve, corresponding coordinates of these points are (T1,n1), (T2,n2), and (T3, n3), and coefficients thereof are C1, C2, and C3, which satisfy the following equation:

$$F(A,B,C)=\Sigma_i^m (Yi-(C1+C2*(1/n)+C3*(1/n^2)))^2,$$

the equation is solved by $\partial F/\partial A=0$, $\partial F/\partial B=0$, and $\partial F/\partial C=0$, so that m=3.

The curve fitting process is selecting the polynomial curve for description. The coefficient of the polynomial can be calculated by the least square method. Theoretically, $T=C_1+C_2\times(1/n)+C_3\times(1/n^2)+ \ldots +Cm\times(1/n^{m-1})$ is adopted for calculation, but in practice the binomial is adapted to satisfy the general requirement. The function relation T=f(n) is a second-order function, $T=C_1+C_2\times(1/n)+C_3\times(1/n^2)$, in which $C_1$, $C_2$, and $C_3$ are coefficients, and n is the rotational speed of the motor. In multiple measured target air volume, each target air volume corresponds to a group of coefficients $C_1$, $C_2$, and $C_3$, and the corresponding relation is stored, so that the corresponding group of the coefficients $C_1$, $C_2$, and $C_3$ is acquired by the microprocessor using the look-up table method according to the input target air volume IN-CFM, thereby obtaining the function relation T=f(n). The air volume of each testing point in a certain load corresponds to a group of coefficients $C_1$, $C_2$, and $C_3$. These are the same as the method disclosed in Example 1, when the input target air volume is different from the air volume of the known testing point, the method of Example 1 can be referred, that is, the constant volume control function T0=F(n) corresponding to the input target air volume can be calculated by the interpolation method.

Example 3

Figure 13:
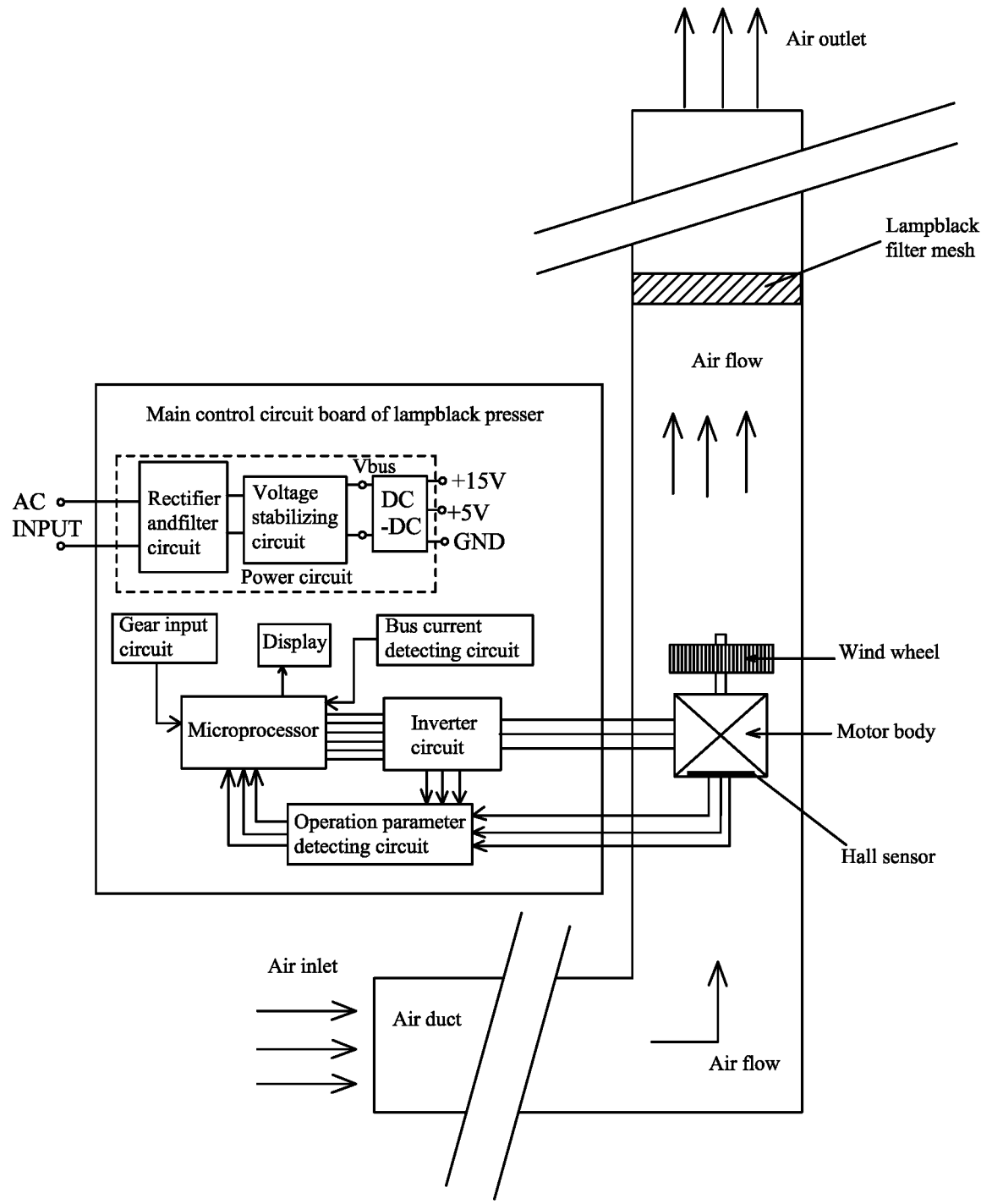
FIG. 13 is a specific schematic block diagram for realizing a method for controlling a constant air volume in accordance with Example 3.

As shown in FIG. 13, the electric device is the lampblack presser. The lampblack presser comprises a system controller which is provided with a main control circuit board for realizing the function of the lampblack presser. A microprocessor, an inverter, an operation parameter detecting circuit, a dependent power circuit, a gear input circuit, and a display circuit are arranged on the main control circuit board. The gear input circuit and the display circuit are connected to the microprocessor, the operation parameter detecting circuit inputs the real-time operation parameters of the motor into the microprocessor, an output terminal of the microprocessor controls the inverter circuit, and the output terminal of the inverter circuit is connected to the coil winding. In the figures, the operation parameter detecting circuit is a Hall sensor which is mounted on the motor body for detecting the rotor position and able to detect the rotor position via the operation parameter detecting circuit. The independent power circuit supplies power for other circuit part. The wind wheel is mounted in the air duct, and a filter screen for filtering the oil fume is mounted in the air duct. The air duct possesses an air inlet and an air outlet. In addition, the microprocessor is further connected to the bus current detecting circuit and performs the constant air volume control by detecting the bus current.

As shown in FIGS. 2-3, the motor comprises a motor body 1. The motor body comprises: a stator assembly 12, a rotor assembly 13, and a housing assembly 11. The stator assembly 13 is mounted on the housing assembly 11, and the rotor assembly 13 is nested within or outside the stator assembly 12.

The method for controlling a constant air volume of the lampblack presser comprises the following steps:

A) establishing M constant air volume control functions $Ii=F(n)$ corresponding to M air volume points $CFM_i$ in the microprocessor of the system controller in the lampblack presser, where I represents a DC bus current, n represents a rotational speed of the motor, and i represents an integer ranging from 1 to M;

B) allowing the microprocessor to receive or preset a target air volume IN-$^{CFM}$;

C) starting the motor, when the motor operates in a stable state, comparing M air volume points CFMi with the target air volume IN-$^{CFM}$, and ensuring that the target air volume IN-$^{CFM}$ falls within two known air volume points CFMi and CFMi−1;

D) using the two known air volume points CFMi and CFMi−1 to calculate a constant air volume control function I0=F(n) corresponding to the target air volume IN-$^{CFM}$ by interpolation method;

E) controlling a motor parameter I0 and a rotational speed n to enable the motor to operate in accordance with a definition curve of the constant air volume control function I0=F(n), and ensuring that an air suction or output of the electric device is constant.

The functions Ii=F(n) are established as follows: for M target air volumes, allowing the motor to operate at a constant rotational speed, regulating a static pressure from a lower boundary to an upper boundary which covers an actual static pressure range in an air duct device, and then regulating the rotational speed n and the DC bus current I of the motor to keep the target air volumes, and recording the rotational speed n and the corresponding DC bus current I at the stable state of the motor. Thus, a group of rotational speeds n and DC bus current I are obtained for each of the M target air volumes, and the function Ii=F(n) is established for each target air volume by curve fitting.

Data in practical test are listed in Table 3.

TABLE 4

| DC bus current (Ampere) | Static pressure (Pa) | Actual air volume Q (CFM) | Actual rotational speed (RPM) |
| --- | --- | --- | --- |
| 1.5 | 25 | 1400 | 314 |
| 2.5 | 50 | 1400 | 935 |
| 3 | 75 | 1400 | 968 |
| ... | ... | ... | ... |
| ... | ... | ... | ... |
| ... | ... | ... | ... |
| 1 | 25 | 1080 | 713 |
| 1.8 | 50 | 1080 | 750 |
| 2.6 | 75 | 1080 | 785 |
| ... | ... | ... | ... |
| ... | ... | ... | ... |
| 0.8 | 25 | 800 | 472 |
| 1.22 | 37.5 | 800 | 501 |
| 1.5 | 50 | 800 | 545 |
| ... | ... | ... | ... |
| ... | ... | ... | ... |

The curve is simulated according to the above data, thus the function I=f(n) is a polynomial function, $I=C_1+C_2\times n+C_3\times n^2$, in which $C_1, C_2 \ldots, C_m$ represent coefficients, n represents the rotational speed of the motor. Each target air volume corresponds to a group of coefficients $C_1, C_2 \ldots, C_m$ and the corresponding relations are stored. A corresponding group of the coefficients $C_1, C_2 \ldots, C_m$ are acquired by the microprocessor according to the input target air volume points IN-CFM by the look-up table method and the interpolation method.

The function I=f(n) is a second order function $I=C_1+C_2\times n+C_3\times n^2$.

The development and the establishment of the mathematical model of the method are as follows: in the air ventilation system, the blower is driven by the blower motor to produce the air flow in a stable state. The constant air volume control is realized by the control of the speed and the DC bus current at a static pressure, which satisfies the relation CFM=F(I, speed, pressure), where CFM represents the air volume, I represents the DC bus current, speed represents the speed, and pressure represents the static pressure. When the static pressure changes, the constant air volume is maintained by controlling the DC bus current and the speed. The DC bus current and the speed change with the increase of the static pressure, which is illustrated by the CFM curves of the constant air volume. Based on the CFM curves, the control model is developed. When the air volume requirement is determined by the product control, the constant air volume CFM is realized by controlling the DC bus current and the speed at a certain static pressure. The characteristic curve represents the physical property of the constant air volume controlled by the DC bus current and the rotational speed. For any designed air flow system in a range of a rated power of the motor based on the test results of the DC bus current and the rotational speed curve, a typical second-order function $I=C_1+C_2 \times n+C_3 \times n^2$ can be used as a typical function for development and modeling. Three undetermined points (A, B, and C) are selected from the curve, corresponding coordinates of these points are (I1,n1), (I2,n2), and (I3,n3), and coefficients thereof are C1, C2, and C3, which satisfy the following equation:

$$F(A,B,C)=\Sigma_i^m(Yi-(C1+C2*n+C3*n^2))^2,$$

the equation is solved by $\partial F/\partial A=0$, $\partial F/\partial B=0$, and $\partial F/\partial C=0$, so that m=3.

The curve fitting process is selecting the polynomial curve for description. The coefficient of the polynomial can be calculated by the least square method. Theoretically, $I=C_1+C_2 \times n+C_3 \times n^2+\ldots+Cm \times n^{m-1}$ is adopted for calculation, but in practice the binomial is adapted to satisfy the general requirement. The function relation I=f(n) is a second-order function, $I=C_1+C_2 \times n+C_3 \times n^2$, in which $C_1$, $C_2$, and $C_3$ are coefficients, and n is the rotational speed of the motor. In multiple measured target air volume, each target air volume corresponds to a group of coefficients $C_1$, $C_2$, and $C_3$, and the corresponding relation is stored, so that the corresponding group of the coefficients $C_1$, $C_2$, and $C_3$ is acquired by the microprocessor using the look-up table method according to the input target air volume IN-CFM, thereby obtaining the function relation I=f(n). The air volume of each testing point in a certain load corresponds to a group of coefficients $C_1$, $C_2$, and $C_3$. These are the same as the method disclosed in Example 1, when the input target air volume is different from the air volume of the known testing point, the method of Example 1 can be referred, that is, the constant volume control function T0=F(n) corresponding to the input target air volume can be calculated by the interpolation method.

Unless otherwise indicated, the numerical ranges involved in the invention include the end values. While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method for controlling a motor of an electric device, the method comprising:

A) storing M constant air volume control functions $Q_i=F(n_i)$ and M air volume points $CFM_i$ in a system controller of the electric device, wherein the motor comprises a rotational shaft, a permanent magnet rotor assembly, a stator assembly, and a housing assembly; the stator assembly comprises a stator core and a coil winding wound on the stator core;

the system controller comprises a main control circuit board; the main control circuit board comprises a microprocessor, an inverter circuit, and an operation parameter detecting circuit;

the motor is a blower motor and is physically connected to the system controller;

the M constant air volume control functions $Q_i=F(n_i)$ and the M air volume points $CFM_i$ are in one-to-one correspondence;

$Q_i$ represents an input power, a DC bus current, or a torque of the motor;

$n_i$ represents a rotational speed of the motor; and i represents an integer ranging from 1 to M;

B) inputting a target air volume IN-CFM into the microprocessor;

C) starting the motor, activating the microprocessor to compare the M air volume points $CFM_i$ with the target air volume IN-CFM to determine two air volume points $CFM_j$ and $CFM_{j-1}$ between which the target air volume IN-CFM falls, wherein j represents an integer ranging from 2 to M, and the two air volume points CFM and $CFM_{j-1}$ correspond to two constant air volume control functions $Q_j=F(n_j)$ and $Q_{j-1}=F(n_{j-1})$, respectively;

D) activating the microprocessor to obtain a constant air volume control function $Q_0=F(n_0)$ corresponding to the target air volume IN-CFM via an interpolation calculation based on the two air volume points $CFM_j$ and $CFM_{j-1}$ and the two constant air volume control functions $Q_j=F(n_j)$ and $Q_{j-1}=F(n_{j-1})$; and E) activating the system controller to adjust a real-time motor parameter $Q_0$ and a real-time rotational speed $n_0$ of the motor in accordance with a definition curve of the constant air volume control function $Q_0=F(n_0)$, whereby controlling a real-time air volume of the electric device at the target air volume IN-CFM, wherein the motor parameter $Q_0$ is a real-time input power, a real-time DC bus current, or a real-time torque of the motor;

wherein the electric device further comprises a wind wheel and a power supply;

the motor is connected to the wind wheel;

permanent magnets are mounted in the permanent magnet rotor assembly;

the permanent magnet rotor assembly and the stator assembly form magnetic coupling;

the operation parameter detecting circuit inputs real-time operation parameters into the microprocessor; and an output terminal of the microprocessor controls the inverter circuit, and an output terminal of the inverter circuit is connected to the coil winding.

2. The method of claim 1, wherein the functions $Q_i=F(n_i)$ are established as follows: for M target air volumes, allowing the motor to operate at a constant rotational speed, regulating a static pressure from a lower boundary to an upper boundary which covers an actual static pressure range in an air duct device, and then regulating a rotational speed n and a motor parameter Q of the motor to adjust the air volume of the motor to be the target air volumes, and recording the rotational speed n and the corresponding parameter Q at the stable state of the motor, whereby obtaining a group of rotational speeds $n_i$ and the motor parameter $Q_i$ for each of the M target air volumes, and establishing the function $Q_i=F(n_i)$ for each target air volume by curve fitting.

3. The method of claim 1, wherein the M air volume points $CFM_i$ comprises a maximum output air volume and a minimum output air volume.

4. The method of claim 2, wherein the M air volume points $CFM_i$ comprises a maximum output air volume and a minimum output air volume.

5. The method of claim 1, wherein $Q_i=F(n_i)$ is a second-order function, and each target air volume point corresponds to a function $Q=C_1+C_2 \times n+C_3 \times n^2$, where $C_1$, $C_2$, and $C_3$ represent coefficients, and n represents the rotational speed of the motor.

6. The method of claim 2, wherein $Q_i=F(n_i)$ is a second-order function, and each target air volume point corresponds to a function $Q=C_1+C_2 \times n+C_3 \times n^2$, where $C_1$, $C_2$, and $C_3$ represent coefficients, and n represents the rotational speed of the motor.

7. The method of claim 5, wherein the constant air volume control function $Q_0=F(n_0)$ corresponding to the target air volume IN-CFM is acquired as follows:

1) selecting three rotational speeds of the motor represented by $n_1$, $n_2$, and $n_3$, inputting the rotational speed $n_1$ into the two constant air volume control functions $Q_j=F(n_{j-1})$ and $Q_{j-1}=F(n_{j-1})$ to obtain two values $Q_{11}$ and $Q_{21}$; inputting the rotational speed $n_2$ into the two constant air volume control functions $Q_j=F(n_{j-1})$ and $Q_{j-1}=F(n_{j-1})$ to obtain two values $Q_{12}$ and $Q_{22}$; inputting the rotational speed $n_3$ into the two constant air volume control functions $Q_j=F(n_{j-1})$ and $Q_{j-1}=F(n_{j-1})$ to obtain two values $Q_{13}$ and $Q_{23}$;

2) calculating a weighted value according to $$w = \frac{CFM - CFM2}{CFM2 - CFM1},$$

and using the weighted value to calculate $Q_{01}$, $Q_{02}$, and $Q_{03}$ of $Q_0$ in the constant air volume control function of the target air volume IN-CFM corresponding to the three rotational speeds $n_1$, $n_2$, and $n_3$, where $Q_{01}=Q_{21}+W \times (Q_{11}-Q_{21})$, $Q_{02}=Q_{22}+W \times (Q_{12}-Q_{22})$, and $Q_{03}=Q_{23}+W \times (Q_{13}-Q_{23})$; and 3) inputting the three rotational speeds $n_1$, $n_2$, and $n_3$ and the corresponding $Q_{01}$, $Q_{02}$, and $Q_{03}$ into the function $Q=C_1+C_2 \times n+C_3 \times n^2$ to acquire coefficients $C_1$, $C_2$, and $C_3$.

8. The method of claim 6, wherein the constant air volume control function $Q_0=F(n_0)$ corresponding to the target air volume IN-CFM is acquired as follows:

1) selecting three rotational speeds of the motor represented by $n_1$, $n_2$, and $n_3$, inputting the rotational speed ni into the two constant air volume control functions $Q_j=F(n_{j-1})$ and $Q_{j-1}=F(n_{j-1})$ to obtain two values $Q_{11}$ and $Q_{21}$; inputting the rotational speed $n_2$ into the two constant air volume control functions $Q_j=F(n_{j-1})$ and $Q_{j-1}=F(n_{j-1})$ to obtain two values $Q_{12}$ and $Q_{22}$; inputting the rotational speed $n_3$ into the two constant air volume control functions $Q_j=F(n_{j-1})$ and $Q_{j-1}=F(n_{j-1})$ to obtain two values $Q_{13}$ and $Q_{23}$;

2) calculating a weighted value according to $$w = \frac{CFM - CFM2}{CFM2 - CFM1},$$

and using the weighted value to calculate $Q_{01}$, $Q_{02}$, and $Q_{03}$ of $Q_0$ in the constant air volume control function of the target air volume IN-CFM corresponding to the three rotational speeds $n_1$, $n_2$, and $n_3$, where $Q_{01}=Q_{21}+W \times (Q_{11}-Q_{21})$, $Q_{02}=Q_{22}+W \times (Q_{12}-Q_{22})$, and $Q_{03}=Q_{23}+W \times (Q_{13}-Q_{23})$; and 3) inputting the three rotational speeds $n_1$, $n_2$, and $n_3$ and the corresponding $Q_{01}$, $Q_{02}$, and $Q_{03}$ into the function $Q=C_1+C_2 \times n+C_3 \times n^2$ to acquire coefficients $C_1$, $C_2$, and $C_3$.

9. The method of claim 1, wherein the electric device is an air conditioner, and the main control circuit board is further connected to a compressor.

10. The method of claim 2, wherein the electric device is an air conditioner, and the main circuit control board is further connected to a compressor.

11. The method of claim 1, wherein the electric device is a lampblack presser; the main control circuit board further comprises a display circuit and a key input circuit; and the display circuit and the key input circuit are connected to the microprocessor.

12. The method of claim 2, wherein the electric device is a lampblack presser; the main control circuit board further comprises a display circuit and a key input circuit; and the display circuit and the key input circuit are connected to the microprocessor.

13. The method of claim 1, wherein a number of the M air volumes is at least five.

14. The method of claim 2, wherein a number of the M air volumes is at least five.

15. A method for controlling a motor of an electric device, the method comprising:

A) storing a plurality of air volume control functions and a plurality of air volume points in a system controller of the electric device, wherein the motor comprises a rotational shaft, a permanent magnet rotor assembly, a stator assembly, and a housing assembly; the stator assembly comprises a stator core and a coil winding wound on the stator core;

the system controller comprises a main control circuit board; the main control circuit board comprises a microprocessor, an inverter circuit, and an operation parameter detecting circuit;

the motor is a blower motor and is physically connected to the system controller;

the plurality of air volume control functions and the plurality of air volume points are in one-to-one correspondence;

the plurality of air volume control functions are functions of a rotational speed of the motor and a motor parameter;

the motor parameter is an input power, a DC bus current, or a torque of the motor;

the electric device further comprises a wind wheel and a power supply;

the motor is connected to the wind wheel;

permanent magnets are mounted in the permanent magnet rotor assembly; the permanent magnet rotor assembly and the stator assembly form magnetic coupling; and the operation parameter detecting circuit inputs real-time operation parameters into the microprocessor; an output terminal of the microprocessor controls the inverter circuit, and an output terminal of the inverter circuit is connected to the coil winding;

B) inputting a target air volume into the microprocessor;

C) starting the motor, activating the microprocessor to compare the plurality of air volume points with the target air volume to determine two air volume points from the plurality of air volume points, wherein the target air volume falls between the two air volume points;

D) activating the microprocessor to obtain a constant air volume control function corresponding to the target air volume via an interpolation calculation based on the two air volume points of C) and two air volume control functions respectively corresponding to the two air volume points of C); and E) activating the system controller to adjust a real-time rotational speed of the motor and a real-time motor parameter in accordance with the constant air volume control function of D), whereby controlling a real-time air volume of the electric device at the target air volume, wherein the real-time air motor parameter is a real-time input power, a real-time DC bus current, or a real-time torque of the motor.

16. The method of claim 15, wherein
the plurality of air volume control functions of A) are established as follows: for a plurality of air volumes, allowing the motor to operate at a constant rotational speed, regulating a static pressure from a lower boundary to an upper boundary which covers an actual static pressure range in an air duct device, and then regulating the rotational speed of the motor and the motor parameter to keep the target air volumes constant, and recording the rotational speed and the corresponding motor parameter at the stable state of the motor, whereby obtaining a group of rotational speeds and motor parameters for each of the plurality of air volumes, and establishing the plurality of air volume control functions for each of the plurality of air volumes by curve fitting.

17. The method of claim 15, wherein the electric device is an air conditioner, and the main control circuit board is further connected to a compressor.

18. The method of claim 15, wherein the electric device is a lampblack presser; the main control circuit board further comprises a display circuit and a key input circuit; and the display circuit and the key input circuit are connected to the microprocessor.

* * * * *